(12) United States Patent
Hsiung

(10) Patent No.: US 7,252,272 B2
(45) Date of Patent: Aug. 7, 2007

(54) FIXED BRACKET ASSEMBLY FOR PORTABLE ELECTRIC PRODUCT

(75) Inventor: Chen Kuo Hsiung, Laguna (HK)

(73) Assignee: Silicon Pyramid Electron, Ltd., Guangzhou (CN)

( * ) Notice: Subject to any disclaimer, the term of this patent is extended or adjusted under 35 U.S.C. 154(b) by 93 days.

(21) Appl. No.: 11/159,859

(22) Filed: Jun. 23, 2005

(65) Prior Publication Data

US 2006/0186289 A1   Aug. 24, 2006

(30) Foreign Application Priority Data

Feb. 5, 2005   (CN) .................. 2005 2 0054618

(51) Int. Cl.
*E04G 3/00* (2006.01)

(52) U.S. Cl. .............................. 248/282.1; 248/278.1; 248/921

(58) Field of Classification Search .............. 248/274.1, 248/282.1, 289.11, 292.12, 917, 919, 921, 248/278.1

See application file for complete search history.

(56) References Cited

U.S. PATENT DOCUMENTS

| 6,915,996 B2 * | 7/2005 | Lin ..................... 248/288.51 |
| 2005/0133678 A1 * | 6/2005 | Dittmer ................ 248/274.1 |
| 2006/0175499 A1 * | 8/2006 | Price et al. ............ 248/278.1 |

\* cited by examiner

*Primary Examiner*—Ramon O Ramirez
(74) *Attorney, Agent, or Firm*—Much Shelist

(57) ABSTRACT

A fixed bracket assembly for adjustably positioning a portable electric product relative to a stationary member. The assembly includes a pair of clamping members pivotally connected to a connecting block assembly and a rod member rotatably connected at one end to the connecting block assembly. The rod member is adjustable connected at its other end to a seat assembly that is connected to the electric product. With this arrangement the electric product can be adjustably moved to whatever position desired and held in place in a "hands free" condition.

7 Claims, 3 Drawing Sheets

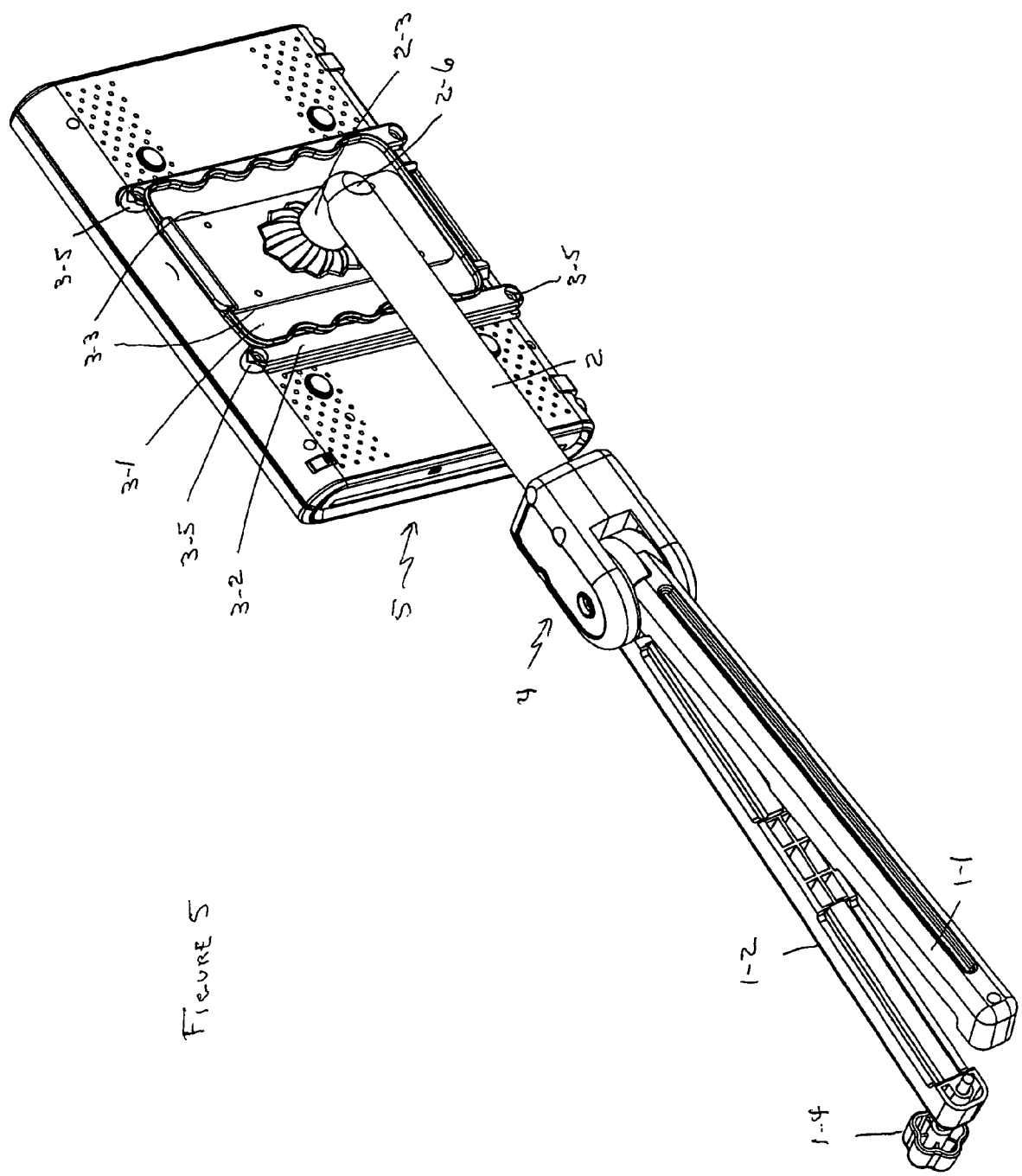

FIXED BRACKET ASSEMBLY FOR PORTABLE ELECTRIC PRODUCT

TECHNICAL DOMAIN

This utility model is directed to a mounting unit especially one that serves as a stationary bracket for portable and visible electric products.

TECHNICAL BACKGROUND

There are more and more varieties of existing portable and visible electric products, such as the palmtop computer, mini-TV and palmtop recorder and players like MP4, etc. as well as DVD players. These portable and visible electric products require flexible movement and convenient portability and use anywhere at any time. They are very popular and are especially suitable for applications in mobile vehicles, such as automobiles, aeroplanes and steamships. This makes it easy for people to entertain or work during their trips. However, such visible electric products currently require that they be handheld and this may make it inconvenient during long-time use. Furthermore, it is difficult to manage to hold them in ones hands, and it is thus possible for the products to fall off and be damaged. It is thus necessary particularly for use in mobile vehicles to design a mounting unit suitable for such products to make them readily affixable and easily adjustable.

DESCRIPTION OF THE INVENTION

The purpose of this utility model is to overcome the defects of the existing technologies and to provide a kind of stationary bracket of simple construction, convenient to use and reliable in performance that can secure the portable and visible electric products quickly and easily with respect to mobile vehicles. The purpose of this utility model will achieve the desired results.

The fixed bracket for a Portable Visual Electronic Product includes a pair of clamping levers, a supporting rod and a seat assembly that connects the bracket assembly to the portable electronic product. The clamping levers are connected to one end of the supporting rod via a connecting block assemblage. The other end of the supporting rod is connected to the seat assembly and the seat assembly is connected to the portable and visible electric product.

One end of the two clamping levers are interlinked to the connecting blocks and the other ends of the clamping levers include screw thread holes so the other ends of two clamping levers can be connected if desired.

There are grooves on the opposing sides of the clamping levers and non-rigid pressable members can be installed inside the grooves, such as plastic or rubber pressable members, etc.

The grooves set in the opposing sides of said clamping levers are in two sections, and the non-rigid pressable members are located inside each section of grooves.

There are relieved portions located on the exterior sides of the non-rigid press members to increase the coefficient of friction and improve the clamping effect.

In addition, there are symmetrical notches on the groove portions of said clamping levers and the notches fold together to form through holes for the clamping levers for connectors to secure the vertical orientation of the clamping levers when they are clamped.

The supporting rod is adjustably connected with the clamping levers by the connecting blocks with the detailed connecting means set forth below: The connecting block assembly consists of two substantially identical opposed members that are fastened together to interconnect the clamping members and the supporting rod for the portable electronic product. The two members together define a groove for receiving the ends of the clamping levers and semi-cylindrical recesses for receiving the supporting rod and a slot for receiving a flange at the end of the supporting rod. One end of each of the two clamping levers overlaps into said groove. Suitable nuts and bolts are provided which bolts go through the through aligned holes in the connecting block members and the overlapped part of two clamping levers and the nuts secure the two clamping levers into the groove between the two members forming the connecting block. When the nuts are loosened the clamping levers can be rotated relative to the connecting blocks as desired.

To accomplish the relative rotation there are circumferential transverse pitches located in the opposing surfaces of the two clamping levers and the two connecting block members. The circumferential transverse pitches of the two clamping levers and those of the two connecting blocks are joggled into an interfitting connection and connected together.

The connecting mode between the said connecting blocks and the supporting rod is as follows: As aforementioned there are semi-cylindrical grooves inside the connecting block members and the supporting rod includes a flange at the end of the round supporting rod which flange fits into opposing grooves located inside the connecting blocks. In addition, leaf springs are located inside the connecting block members for retaining the rod in position relative to the connecting block members. The leaf springs engage circumferential transverse pitches set around the round supporting rod. The circumferential transverse pitches are distributed continuously or discontinuously around the circumference of the round supporting rod and the leaf springs are connected inside the connecting blocks to engage the circumferential transverse pitches to locate the round supporting rod.

The supporting rod is connected to the seat assembly by bolts. There are circumferential transverse pitches on the abutting surfaces of the supporting rod and the seat assembly, only one of which is shown. The two circumferential transverse pitches are joggled and interlinked to locate the seat assembly when it is rotated relative to the supporting rod.

The seat assembly includes a seat body and an active clipping piece. There are clipping flanges set on the seat body, and the clipping piece is connected to the portable and visible Electric Product with bolts. There are elastic stoppers on the back of the clipping piece. The active clipping piece and the seat body are connected to the clipping flanges via the clipping piece.

The seat body of the said fixing seat has the elastic stoppers and the said elastic stoppers are located at one end of the clipping flange to lock the active clipping piece after it is connected to the piece seat so as to prevent the portable and visible electric products from sliding off accidentally.

The operating principle of this utility model is that the clamping members of this fixed bracket can be clamped and fixed onto other fixed members such as a connecting bar between the car chairs and the head cushion. The bracket assembly can also connect and secure the portable and visible electric product onto a stationary barrier to other units for normal use. In order to adjust the watching directions, the user can merely turn the supporting rod relative to the clamping member via the connecting block assembly.

Also, the supporting rod spins around its own axis of symmetry. For the visible electric products with different screen directions, just turn the fixing seat assembly relative to the supporting rod.

Compared to the existing technologies, this utility model has the following advantages and effects: (1) safe and reliable usage: the portable and visible electric products can be fixed via this stationary barrier stably and reliably so that the users don't have to hold it with their hands while watching and appreciating the displayed contents freely. At the same time, the technology can prevent the portable and visible electric products from falling off and damaging it so as to safeguard the electric device effectively at the time of convenient application; (2) easy usage and good applicability: there are various usages for this stationary barrier, the users can adjust the watching directions and angles freely as per their favorites with simple and convenient usage. In addition, this fixed bracket assembly can be applied to the common vehicles especially in various cars. Further, this assembly can be applied to fasten various existing portable and visible electric products such as a palmtop computer, mini-TV and palmtop recorder and portable DVD player like MP4, etc., having wide applications and promising market shares;

BRIEF DESCRIPTION OF THE DRAWINGS

FIG. 5 is a perspective view showing the supporting rod affixed to the back of the Portable Video Product.

DETAILED DESCRIPTION OF THE DRAWINGS

The following detailed description of applicant's fixed bracket assembly is the preferred embodiment, but the bracket assemblies can be varied within the scope of the invention covered by the claims.

Figure 1:
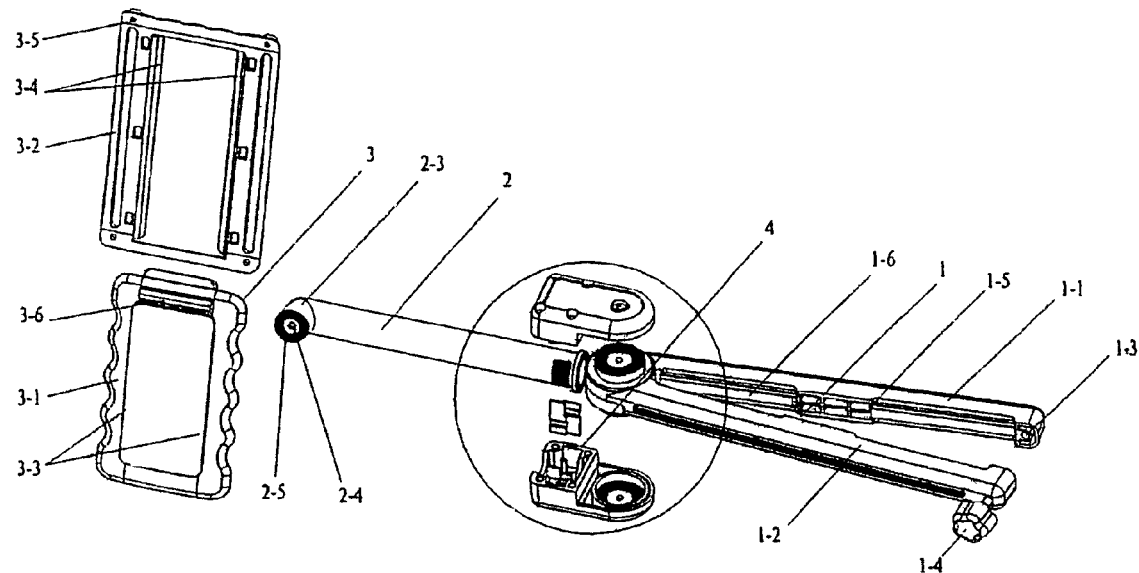
FIG. 1 is an exploded view of the novel fixed bracket assembly for a Portable Video Electronic Product.

Referring first to FIG. 1, the detailed structure of the fixed bracket assembly for the portable and visible electric product includes the clamping levers 1-1 and 1-2, a round supporting rod 2 and a fixing seat assembly 3. The clamping levers 1-1 and 1-2 are connected to one end of the supporting rod 2 via the connecting block assembly 4. The other end of the round supporting rod 2 is connected to fixing seat assembly 3. One end of each of the said two clamping levers 1-1 and 1-2 are interlinked with the connecting block assembly 4. There are the screw thread holes 1-3 located on the other ends of the clamping levers 1-1 and 1-2, to connect the screw threads on the other ends of the two clamping levers 1-1 and 1-2 together with setscrews 1-4.

There are grooves 1-5 on the opposing sides of the clamping levers 1-1 and 1-2. The grooves 1-5 are in two sections and non-rigid pressing members 1-6 can be respectively installed inside the grooves 1-5. These pressing members can be made of compressible plastic or rubber, etc. There are relieved portions (not shown in the figure) located on the exposed side of the said non-rigid pressing members 1-6 to increase the coefficient of friction and improve the clamping effect.

Figure 2:
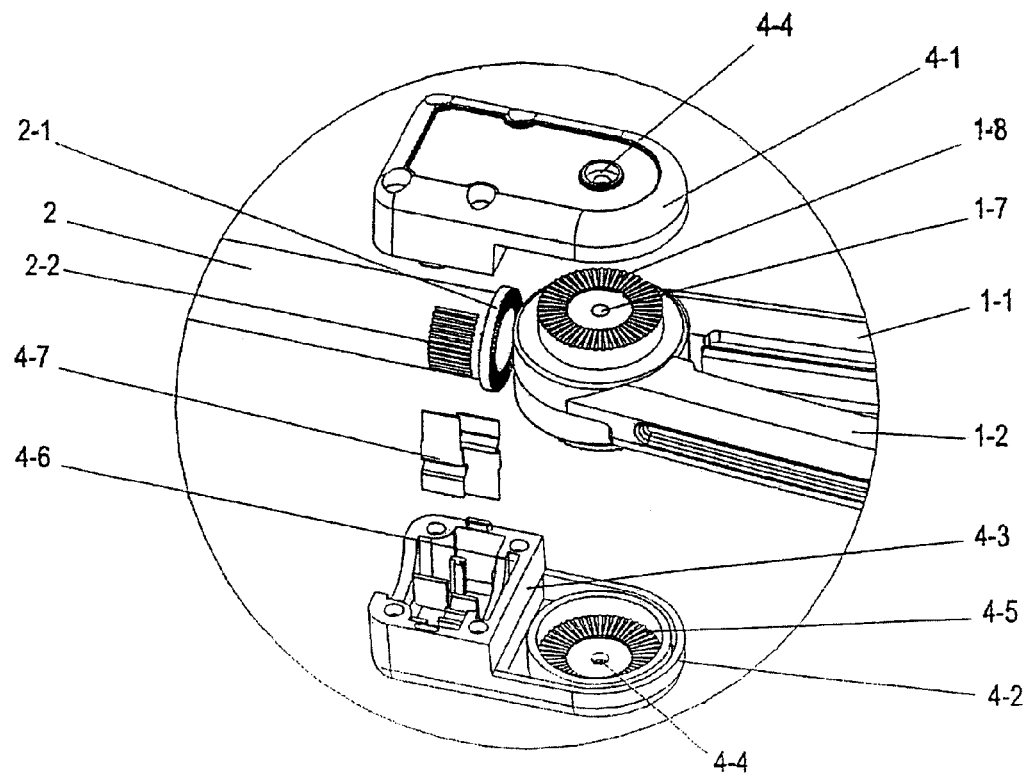
FIG. 2 is an enlarged view of the portion of the fixed bracket assembly for the Portable Video Product circled in FIG. 1.

The detailed structure for the connection of the connecting block assembly 4 and clamping levers 1-1, 1-2, are shown as in FIG. 2: There are two opposed extending portions 4-1 and 4-2 of the connecting block assembly. Defined between these opposed portions 4-1 and 4-2 of the connecting block assembly 4 is a groove 4-3. One end of the two clamping levers 1-1 and 1-2 overlap and extend into the groove 4-3. The portions 4-1 and 4-2 define holes 4-4 and the two clamping levers 1-2 and 1-2 are overlapped and form a through hole 1-7 which is in alignment with holes 4-4. Bolts will go through hole 1-7 defined by the overlapped parts of two clamping levers 1-1 and 1-2 and holes 4-4 of the two extending portions 4-1 and 4-2 of the connecting block 4 and a nut will be fastened thereon to secure the two clamping levers 1-1 and 1-2 and connecting block assembly together. When the nut is loosened, the two clamping levers 1-1 and 1-2 can be moved relative to the connecting blocks 4-1, 4-2 to vary their positions. There are circumferential transverse pitches 1-8 and 4-5 in the adjacent surfaces of the two clamping levers 1-1 and 1-2 and two extending portions 4-1 and 4-2. The circumferential transverse pitches 1-8 of two clamping levers 1-1 and 1-2 and the circumferential transverse pitches 4-5 of two fixing nips 4-1 and 4-2 are joggled and connected together.

The detailed connecting mode between the connecting block assembly 4 and the round supporting rod 2 is shown in FIG. 2: There are generally semi-cylindrical slots 4-6 inside the connecting block members 4-1 and 4-2 that receive the flange 2-1 at the end of the round supporting rod 2. In addition, there are leaf springs 4-7 inside the connecting block members 4-1 and 4-2 that contact the circumferential transverse pitches 2-2 set around the round supporting rod 2 in order to locate the round supporting rod 2 in position when the rod is rotated to a location relative to the connecting block assembly 4. The said circumferential transverse pitches 2-2 are distributed continuously or discontinuously on the circumference of the round supporting rod 2 and the leaf springs 4-7 are connected inside the circumferential transverse pitches 2-2 to locate the round supporting rod 2.

We now refer to FIGS. 1 and 5 for the connection relationship between the round supporting rod 2 and fixing seat assembly 3. Bolt holes 2-4 are located on the end 2-3 of the round supporting rod 2 and the back of the fixing seat 3. The supporting rod 2 is connected to the fixing seat assembly by bolt 2-6 (see FIG. 5). There are circumferential transverse pitches 2-5 on the rod and the seat assembly (the circumferential transverse pitches of fixing seat 3 assembly is not shown in FIG. 5, but is located under the transverse pitches 2-5 when in the assembled position of FIG. 5). The two circumferential interengaging transverse pitches on the rod and seat assembly are joggled and interlinked to locate the fixing seat 3 assembly when it has been rotated relative relative to the round supporting rod 2 to the desired position and fixed in position by bolt 2-6.

Figure 3:
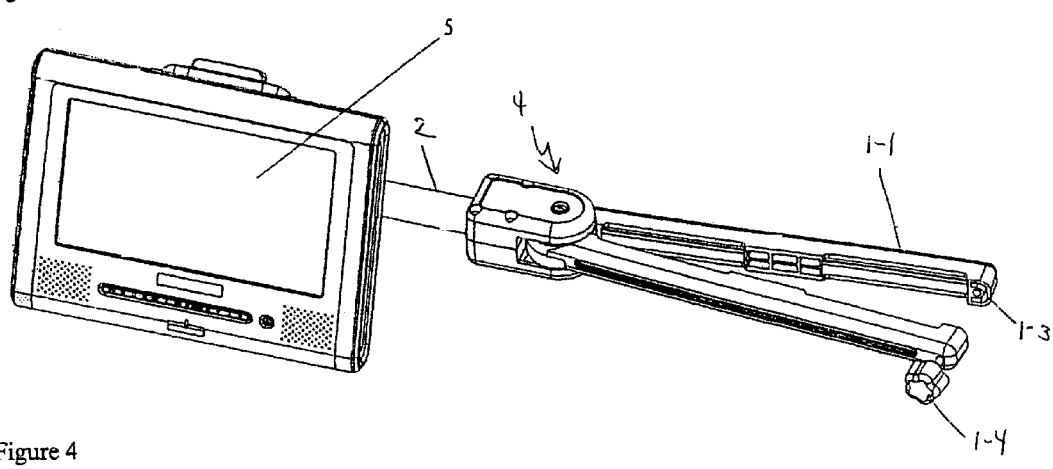
FIG. 3 is a perspective view of the fixed bracket assembly secured to a Portable Video Product.

As shown in FIG. 1, the said fixing seat 3 includes the seat body 3-1 and active clipping piece 3-2. There are clipping flanges 3-3 set on the seat body 3-1. The active clipping piece 3-2 is connected to the clipping block 3-4 on the back of clipping flange 3-3 via the clipping block 3-4. There are four through holes 3-5 symmetrically on the said active clipping piece 3-2 and the said active clipping piece 3-2 is connected to the portable and visible electric product with bolts. The seat body 3-1 of the said fixing seat assembly 3 has the elastic stoppers 3-6 and the said elastic stoppers 3-6 are located at one of the clipping flange 3-3 to lock the active clipping piece 3-2 after it is connected to the piece seat 3-1 so as to prevent the portable and visible electric products to slide off accidentally. The fixed bracket is connected to the rear of the portable DVD player 5 as shown in FIG. 3. The fixing nip 1 of this fixed bracket assembly can be clamped and fixed onto other fixities such as the connecting bar between the car chairs and a head cushion. It can also be used to connect and secure the portable visible electric product to other types of stationary barriers.

In order to adjust the watching directions, the user can turn the round supporting rod 2 relative to the fixing nip 1 via the connecting blocks 4. Also, to adjust the watching angles, the user can turn the round supporting rod 2 relative to the fixing nip 1 (namely, the round supporting rod 2 springs around its own axis of symmetry). For the visible electric products with different screen directions, just turn the fixing seat 3 assembly relative to the round supporting rod 2 by loosening the connection therebetween and then tightening same.

Figure 4:
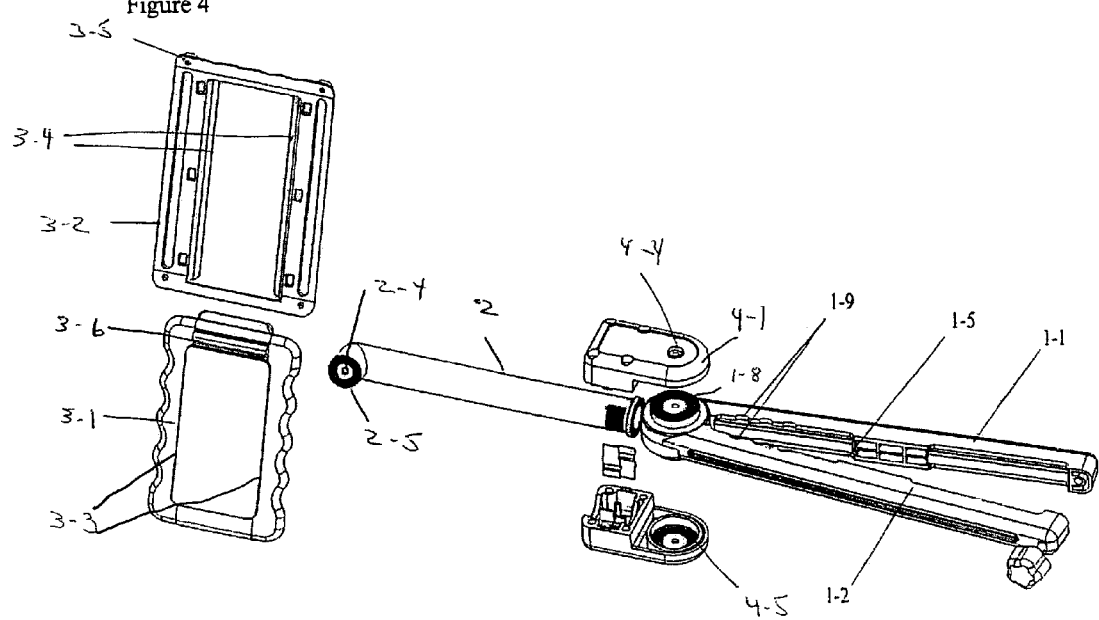
FIG. 4 is an exploded view similar to FIG. 1 showing a second embodiment of applicant's novel fixed bracket assembly for a Portable Video Product.

FIG. 4 shows another embodiment of applicant's invention. It can be seen from FIG. 4 that the fixed bracket assembly for the portable and visible electric product has similar features to those illustrated and described with respect to the first embodiment except for the following items: In FIG. 4, there are notches 1-9 at the ends of grooves 1-5 that are symmetrical on the two clamping levers 1-1 and 1-2. The arc notches 1-9 of two clamping levers 1-1 and 1-2 will form a round through hole going through the clamping levers when they are folded together. This can be used to clamp the fixing rod, such as the connecting bar between the car chairs and the head cushion, so as to achieve the vertical positioning of the fixing rod, namely that after clamping the fixing rod, the fixing nip 1 will not move in the direction of the vertical fixing rod in the direction parallel to the two clamping levers.

It is intended to cover by the appended claims all embodiments that come within the true spirit and scope of the invention.

The invention claimed is:

1. A fixed bracket assembly for adjustably positioning a portable electric product relative to a stationary member comprising a pair of clamping members pivotally connected to a connecting block assembly, the connecting block assembly includes cooperating blocks that define a recess for receiving the ends of the clamping members, means for securing the blocks together, the cooperating blocks and clamping members defining cooperating transverse pitches whereby the clamping members can be positioned relative to each other and relative to the cooperating blocks and when the blocks are secured together the clamping members will remain in their set position, a rod having a first end rotatably connected to said connecting block assembly and extending away from said clamping members and a seat assembly adjustably connected to the other end of said rod and adapted to be connected to the portable electric product whereby the electric product can be adjustably positioned relative to said bracket assembly.

2. A fixed bracket assembly as set forth in claim 1 in which the first rod end includes a flange that is retained in recesses defined by the connecting blocks and can be rotated relative to the clamping members to change the position of the portable electric product relative to the clamping member and when the connecting blocks are secured together the rod is held in position.

3. A fixed bracket assembly as set forth in claim 2 in which the first rod end defines a transverse pitch disposed about a portion of its circumference and leaf springs are disposed in a recess defined by said connecting blocks and in engagement with the transverse pitch of said rod for preventing it from rotating.

4. A fixed bracket assembly as set forth in claim 2 in which the other end of said rod and the seat assembly define cooperating transverse pitches whereby the seat assembly and associated portable electric product can be rotated relative to each other when desired and secured together by suitable means after the predetermined position has been established.

5. A fixed bracket assembly as set forth in claim 4 in which the seat assembly comprises a seat body that includes the transverse pitch means cooperating with the transverse pitch member secured to said other rod end which seat body is adapted to be converted to a clipping piece connected to the portable electric product to enable the position of the electric product to be adjusted relative to said bracket assembly.

6. A fixed bracket assembly for adjustably positioning a portable electric product relative to a stationary member comprising a pair of clamping members pivotally connected to a connecting block assembly which clamping members define arcuate notches so that the clamping members can receive fastening means to lock the clamping members in position, a rod having a first end rotatably connected to said connecting block assembly and extending away from said clamping members and a seat assembly adjustably connected to the other end of said rod and adapted to be connected to the portable electric product whereby the electric product can be adjustably positioned relative to said bracket assembly.

7. A fixed bracket assembly for adjustably positioning a portable electric product relative to a stationary member comprising a pair of clamping members pivotally connected to a connecting block assembly and fastening means at one end for securing the bracket assembly to the stationary member including non-rigid pressing members disposed in grooves defined by said clamping members to facilitate a clamping action, a rod having a first end rotatably connected to said connecting block assembly and extending away from said clamping members and a seat assembly adjustably connected to the other end of said rod and adapted to be connected to the portable electric product whereby the electric product can be adjustably positioned relative to said bracket assembly.

* * * * *